United States Patent
Zhang et al.

(10) Patent No.: US 11,211,594 B2
(45) Date of Patent: Dec. 28, 2021

(54) COMPOSITE CURRENT COLLECTOR AND COMPOSITE ELECTRODE AND ELECTROCHEMICAL DEVICE COMPRISING THE SAME

(71) Applicant: NINGDE AMPEREX TECHNOLOGY LIMITED, Ningde (CN)

(72) Inventors: Yibo Zhang, Ningde (CN); Xiang Li, Ningde (CN); Bin Wang, Ningde (CN); Qiaoshu Hu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 252 days.

(21) Appl. No.: 16/669,131

(22) Filed: Oct. 30, 2019

(65) Prior Publication Data
US 2020/0313155 A1 Oct. 1, 2020

(30) Foreign Application Priority Data
Mar. 29, 2019 (CN) .......................... 201910249013.5

(51) Int. Cl.
*H01M 4/04* (2006.01)
*H01M 4/131* (2010.01)
*H01M 4/136* (2010.01)
*H01M 4/1393* (2010.01)
(Continued)

(52) U.S. Cl.
CPC ......... *H01M 4/0404* (2013.01); *H01M 4/131* (2013.01); *H01M 4/136* (2013.01);
(Continued)

(58) Field of Classification Search
CPC .......... H01M 10/052; H01M 10/0585; H01M 4/0404; H01M 4/13; H01M 4/131;
(Continued)

(56) References Cited

U.S. PATENT DOCUMENTS

2012/0315537 A1* 12/2012 Ravdel .................. H01M 4/668
429/209
2019/0305320 A1* 10/2019 Liang ...................... H01M 4/70

FOREIGN PATENT DOCUMENTS

CN 103003992 A 3/2013
CN 104078686 A 10/2014
(Continued)

OTHER PUBLICATIONS

Chinese Second Office Action dated Nov. 3, 2020 in counterpart Chinese application 201910249013.5, 7 pages.
(Continued)

*Primary Examiner* — Lingwen R Zeng
(74) *Attorney, Agent, or Firm* — Juan Carlos A. Marquez; Marquez IP Law Office, PLLC (57) ABSTRACT

The present application relates to a composite current collector, and a composite electrode and an electrochemical device comprising the same. The composite current collector of the present application comprises an intermediate layer, a first metal layer, a second metal layer, and a through hole. The intermediate layer has a first surface and a second surface opposite to the first surface, the first metal layer is disposed on the first surface, and the second metal layer is disposed on the second surface. The through hole penetrates through the intermediate layer, the first metal layer and the second metal layer, wherein the through hole is filled with an electrically insulated ionic conductor.

20 Claims, 3 Drawing Sheets

(51) Int. Cl.
*H01M 4/1397* (2010.01)
*H01M 4/36* (2006.01)
*H01M 4/66* (2006.01)
*H01M 4/62* (2006.01)
*H01M 10/052* (2010.01)
*H01M 4/13* (2010.01)
*H01M 10/0585* (2010.01)

(52) U.S. Cl.
CPC ....... *H01M 4/1393* (2013.01); *H01M 4/1397* (2013.01); *H01M 4/366* (2013.01); *H01M 4/13* (2013.01); *H01M 4/62* (2013.01); *H01M 4/661* (2013.01); *H01M 4/663* (2013.01); *H01M 4/666* (2013.01); *H01M 4/667* (2013.01); *H01M 4/668* (2013.01); *H01M 10/052* (2013.01); *H01M 10/0585* (2013.01); *Y02E 60/10* (2013.01)

(58) Field of Classification Search
CPC .. H01M 4/136; H01M 4/1393; H01M 4/1397; H01M 4/366; H01M 4/62; H01M 4/661; H01M 4/663; H01M 4/666; H01M 4/667; H01M 4/668; Y02E 60/10
See application file for complete search history.

(56) References Cited

FOREIGN PATENT DOCUMENTS

| | | |
|---|---|---|
| CN | 108110257 A | 6/2018 |
| CN | 108281608 A | 7/2018 |
| CN | 108390068 A | 8/2018 |
| CN | 108550859 A | 9/2018 |
| JP | 10048562 A | 8/1999 |

OTHER PUBLICATIONS

Chinese First Office Action dated May 8, 2020 in counterpart Chinese application 201910249013.5, 6 pages.

* cited by examiner

COMPOSITE CURRENT COLLECTOR AND COMPOSITE ELECTRODE AND ELECTROCHEMICAL DEVICE COMPRISING THE SAME

CROSS REFERENCE TO RELATED APPLICATIONS

The present application claims the benefit of priority from the China Patent Application No. 201910249013.5, filed on 29 Mar. 2019, the disclosure of which is hereby incorporated by reference in its entirety.

BACKGROUND

1. Technical Field

The present application relates to the field of energy storage technologies, and more particularly to a composite current collector, and a composite electrode, and an electrochemical device including the same.

2. Description of the Related Art

Lithium-ion batteries have many advantages, such as large volume and mass energy density, long cycle life, high nominal voltage, low self-discharge rate, small size and light weight, and are widely applied in the field of consumer electronics. With the rapid development of electric vehicles and mobile electronic devices in recent years, there is a growing demand in aspects including energy density, safety, and cycle performance of lithium-ion batteries.

A current collector is an important component in a lithium-ion battery, and has the function of collecting current generated by the active materials of the lithium-ion battery to form a relatively large current for external output. The use of a composite current collector can further increase energy density, improve durability and elongation so as achieving process optimization in production, increase unit mass energy density, and improve safety.

In order to further improve the electrical performance of an electrochemical device, it is necessary to further optimize the composite current collector.

SUMMARY

The present application provides a composite current collector, and a composite electrode, and an electrochemical device including the same in an attempt to solve at least one of the problems found in the related art at least to a certain extent.

According to a first aspect of the present application, the present application provides a composite current collector, including an intermediate layer, a first metal layer, a second metal layer, and defines a through hole. The intermediate layer has a first surface and a second surface opposite to the first surface, the first metal layer is disposed on the first surface, and the second metal layer is disposed on the second surface. The through hole penetrates through the intermediate layer, the first metal layer and the second metal layer, wherein the through hole is filled with an electrically insulated ionic conductor. Since the through hole is filled with the ionic conductor capable of conducting ions while maintaining electronic insulation, the through hole can form an ion path connecting both sides of the above composite current collector to improve the ion conductivity of the composite current collector, thereby improving the electrical performance thereof.

According to some embodiments of the present application, the pore size of the through hole is about 20 μm to about 3000 μm, the average pore density of the through hole is about 1 pore/cm² to about 100 pores/cm², and the average pore area ratio of the through hole is about 0.001% to about 30%.

According to some embodiments of the present application, the first metal layer and the second metal layer each are at least one selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and a combination thereof.

According to some embodiments of the present application, the ionic conductor is a solid electrolyte material or a mixture of an inorganic material and a binder.

According to some embodiments of the present application, the solid electrolyte material is at least one selected from the group consisting of polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

According to some embodiments of the present application, the inorganic material includes an inorganic oxide, and the inorganic oxide is at least one selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate ($Li_3PO_4$), lithium titanium phosphate ($Li_xTi_y(PO_4)_3$, wherein 0<x<2 and 0<y<3), lithium aluminum titanium phosphate ($Li_xAl_yTi_z(PO_4)_3$, wherein 0<x<2, 0<y<1, and 0<z<3), $Li_{1+x+y}(Al,Ga)_x(Ti,Ge)_{2-x}Si_yP_{3-y}O_{12}$, wherein 0≤x≤1 and 0≤y≤1, lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), lithium nitride ($Li_xN_y$, wherein 0<x<4 and 0<y<2), $SiS_2$ glass ($Li_xSi_yS_z$, wherein 0≤x<3, 0<y<2, and 0<z<4), $P_2S_5$ glass ($Li_xP_yS_z$, wherein 0≤x<3, 0<y<3, and 0<z<7), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, and garnet ceramic ($Li_{3+x}La_3M_2O_{12}$, wherein 0≤x≤5, and M is Te, Nb, or Zr).

According to some embodiments of the present application, the binder is at least one selected from the group consisting of polyamide, polyurethane, ethylene-vinyl acetate copolymer (EVA), ethylene-vinyl alcohol copolymer (EVOH), acrylate, sodium alginate (SA), polyacrylic acid (PAA), polyvinyl alcohol (PVA), carboxymethyl chitosan, gelatin, polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

According to some embodiments of the present application, the intermediate layer is at least one selected from the group consisting of polyethylene terephthalate, polybutylene terephthalate, polyethylene naphthalate, polyetheretherketone, polyimide, polyamide, polyethylene glycol, polyamideimide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, polyethylene, polyvinyl chloride, polystyrene, polyether nitrile, polyurethane, polyphenylene oxide, polyester, polysulfone, and derivatives thereof.

According to a second aspect of the present application, the present application provides a composite electrode, including the composite current collector in the above embodiments, a cathode active material layer and an anode active material layer, wherein the cathode active material layer covers the first metal layer, and the anode active material layer covers the second metal layer.

According to some embodiments of the present application, the through hole further penetrates through the cathode active material layer and the anode active material layer.

According to some embodiments of the present application, the composite electrode further includes a conductive coating, arranged in at least one of the following two situations: between the cathode active material layer and the first metal layer, and between the anode active material layer and the second metal layer.

According to some embodiments of the present application, the conductive coating includes a conductive agent and a polymer, wherein the conductive agent is at least one selected from the group consisting of carbon nanotubes, conductive carbon black, acetylene black, artificial graphite, graphene, and metal nanowires; and the polymer is at least one selected from the group consisting of polyethylene terephthalate, polybutylene terephthalate, polyethylene naphthalate, polyetheretherketone, polyimide, polyamide, polyethylene glycol, polyamideimide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, polyethylene, polyvinyl chloride, polystyrene, polyether nitrile, polyurethane, polyphenylene oxide, polyester, polysulfone, and derivatives thereof.

According to a third aspect of the present application, the present application provides an electrochemical device, including the composite electrode in the above embodiments.

According to some embodiments of the present application, the electrochemical device is a lithium-ion battery.

According to a fourth aspect of the present application, the present application further provides an electronic device, including the electrochemical device in the above embodiments.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the prior art so as to facilitate the description of the embodiments of the present application. Obviously, the accompanying drawings described below are only part of the embodiments of the present application. For a person skilled in the art, the accompanying drawings of other embodiments can still be obtained according to the structures illustrated in the accompanying drawings without any creative effort.

EMBODIMENTS

Embodiments of the present application are described in detail below. Throughout the specification, the same or similar components and components having the same or similar functions are denoted by similar reference numerals. The embodiments described herein with respect to the accompanying drawings are illustrative and graphical, and are used for providing a basic understanding of the present application. The embodiments of the present application should not be construed as limiting the present application.

As used herein, the terms "substantially", "generally", "essentially" and "about" are used to describe and explain small variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference value between the two values is less than or equal to ±10% of the average of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), then the two values can be considered "generally" the same.

In the specification, unless otherwise particularly specified or defined, relative terms such as "central", "longitudinal", "lateral", "front", "rear", "right", "left", "internal", "external", "lower", "higher", "horizontal", "vertical", "higher than", "lower than", "upper", "lower", "top", "bottom" and their derivatives (such as "horizontally", "downward", and "upward") should be construed as referring to the directions described in the specification or shown in the accompanying drawings. These relative terms are used for convenience only in the description and are not required to construct or operate the present application in a particular direction.

In addition, amounts, ratios and other numerical values are sometimes presented herein in a range format. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

The present application further improves the design of a composite current collector. The improved composite current collector includes: an intermediate layer, metal layers disposed on both sides of the intermediate layer, and a through hole. The through hole penetrates through the intermediate layer and the metal layers, and is filled with an electrically insulated ionic conductor. In the present application, the through hole is filled with the ionic conductor capable of conducting ions while maintaining electronic insulation to establish an ion path connecting both sides of the composite current collector, so that the ion conductivity is improved, thereby improving the electrical performance of an electrochemical device. In addition, since an ion conducting path is established to connect the electrode active material layers disposed on two farthest ends of the ionic conductor, the composite electrode made by using the composite current collector can ensure the capacity performance of cathode and anode active materials under high electrode compacted density and high coating weights of the cathode and anode active materials, thereby further improving the energy density of the composite electrode.

The structure, material composition and preparation method of a composite current collector in various embodiments of the present application, and the configuration of the composite current collector in a composite electrode and an electrochemical device will be further described below in conjunction with FIGS. 1-4.

1. Composite Current Collector

Figure 1A:
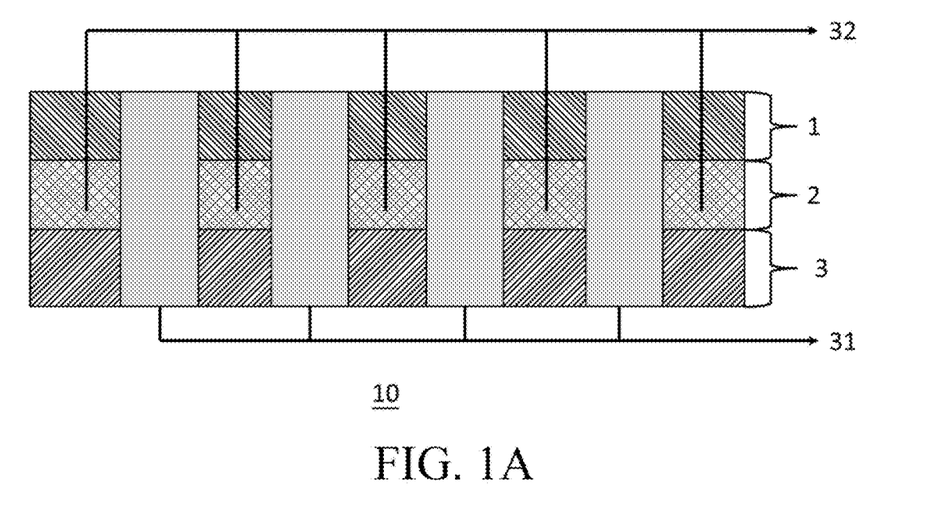
FIG. 1A is a cross-sectional view of a composite current collector in some embodiments of the present application.
Figure 1B:
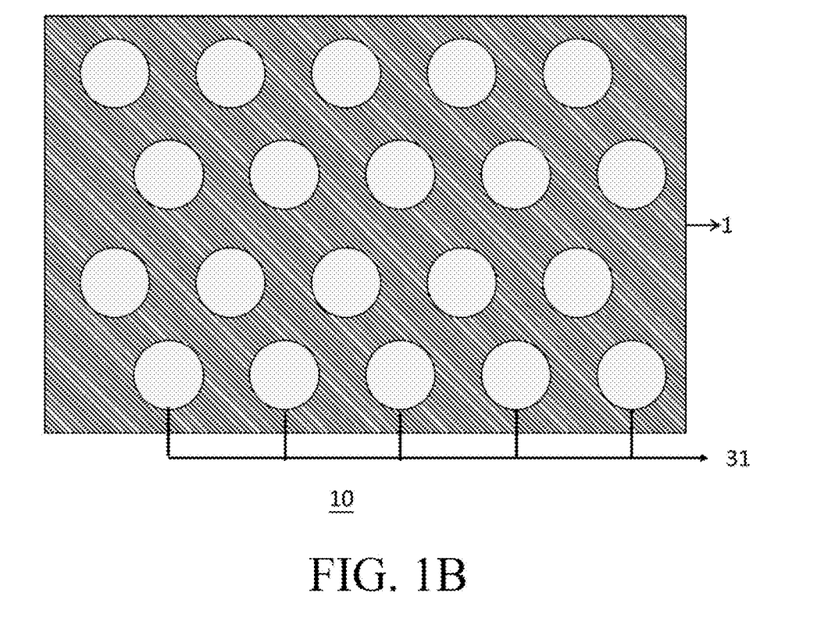
FIG. 1B is a top view of a composite current collector in some embodiments of the present application.

FIG. 1A and FIG. 1B are cross-sectional and top-view structure diagrams of a composite current collector according to some embodiments of the present application respectively.

As shown in FIG. 1A and FIG. 1B, a composite current collector 10 includes: a first metal layer 1, an intermediate layer 2, a second metal layer 3, and defines a plurality of through holes 31. The intermediate layer 2 has a first surface and a second surface opposite to the first surface, the first metal layer 1 is disposed on the first surface, and the second metal layer 3 is disposed on the second surface. The plurality of through holes 31 penetrates through the intermediate layer, the first metal layer and the second metal layer, where the plurality of through holes 31 is filled with an electrically insulated ionic conductor. The plurality of through holes 31, filled with the ionic conductor capable of conducting ions while maintaining electrical insulation, can form an ion path connecting both sides of the composite current collector 10 to improve the ion conductivity of the composite current collector, thereby improving the electrical performance thereof.

As shown in FIG. 1B, the plurality of through holes 31 are circular holes evenly distributed in the composite current collector 10. It will be appreciated that the shape and distribution of the plurality of through holes 31 are not particularly limited as long as the each through hole 31 can penetrate through the first metal layer 1, the intermediate layer 2 and the second metal layer 3 in the composite current collector 10. In some embodiments, each through hole 31 may be, for example, but not limited to, circular, elliptical, triangular, square and rectangular. In some embodiments, the plurality of through holes 31 may be evenly distributed or may be unevenly distributed.

In some embodiments, the average pore size of each through hole 31 is about 20 μm to about 3000 μm. When the pore size is too small, the ion conductivity of a single hole is limited, and it is difficult to improve the ion conductivity. In contrast, when the pore size is too large, the surface area of a single hole is too large, which affects electron transmission path near the hole, reduces the electron conductivity of the first metal layer 1 or the second metal layer 3, and is disadvantageous to the electrical performance of an electrode assembly.

In some embodiments, the average pore density of each through hole 31 is about 1 pore/cm$^2$ to about 100 pores/cm$^2$. When the pore density is too small, the region of a single hole capable of improving the ion conductivity is limited, and some effective material regions far away from the hole cannot achieve the purpose of improving the ion conductivity. When the pore density is too large, electron transmission path near each hole may be affected, thereby reducing the electron conductivity of the first metal layer 1 or the second metal layer 3, which is disadvantageous to the electrical performance of an electrode assembly.

In some embodiments, the average pore area ratio of each through hole 31 is about 0.001% to about 30%. When the pore area ratio is too small, the improvement of the total ion conductivity of each hole is limited, which fails to effectively achieve the purpose of improving the ion conductivity. When the pore area ratio is too large, entire electron transmission path may be affected, thereby reducing the electron conductivity of a metal layer, which is disadvantageous to the electrical performance of an electrode assembly.

In some embodiments, the ionic conductor filled in the plurality of through holes 31 may be a solid electrolyte material. The solid electrolyte material is at least one selected from the group consisting of polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

In some other embodiments, the ionic conductor filled in the plurality of through holes 31 may be a mixture of an inorganic material and a binder. The mixture ensures electrical insulation, while gaps in the mixture also provide a penetration path for effective electrolytic solution, which is advantageous to conduct ions. The inorganic material includes an inorganic oxide being at least one selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al,Ga)_x(Ti,Ge)_{2-x}Si_yP_{3-y}O_{12}$, wherein $0\leq x\leq 1$ and $0\leq y\leq 1$, lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$ and $0<y<2$), $SiS_2$ glass ($Li_xSi_yS_z$, wherein $0\leq x<3$, $0<y<2$, and $0<z<4$), $P_2S_5$ glass ($Li_xP_yS_z$, wherein $0\leq x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, and garnet ceramic ($Li_{3+x}La_3M_2O_{12}$, wherein $0\leq x\leq 5$, and M is Te, Nb, or Zr).

The binder is at least one selected from the group consisting of polyamide, polyurethane, ethylene-vinyl acetate copolymer (EVA), ethylene-vinyl alcohol copolymer (EVOH), acrylate, sodium alginate (SA), polyacrylic acid (PAA), polyvinyl alcohol (PVA), carboxymethyl chitosan, gelatin, polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

In some embodiments, the intermediate layer 2 may be a plastic film 32. The plastic film 32 is at least one selected from the group consisting of polyethylene terephthalate, polybutylene terephthalate, polyethylene naphthalate, polyetheretherketone, polyimide, polyamide, polyethylene glycol, polyamideimide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, polyethylene, polyvinyl chloride, polystyrene, polyether nitrile, polyurethane, polyphenylene oxide, polyester, polysulfone, and derivatives thereof.

In some embodiments, the porosity of the intermediate layer 2 is about 0% to about 50%. Porosity facilitates weight reduction and increases the effective material loading thereof while increasing the surface area of the composite current collector to improve the electron transmission path. As the porosity is larger, a larger area of the surface of the intermediate layer 2 may be covered by a metal layer when the first metal layer 1 or the second metal layer 3 is prepared. For example, an inner wall of a hole near the surface of the intermediate layer 2 is also evaporated with a layer of metal to become really part of the first metal layer 1 or the second metal layer 3. However, if the porosity is too large, when forming the first metal layer 1 or the second metal layer 3 on the surface of the intermediate layer 2, the metal layers on both sides of the intermediate layer 2 may be penetrated through the intermediate layer and connected together, resulting in failures caused by direct connection of cathode and anode current collectors of the entire electrode assembly.

In some embodiments, the thickness of the intermediate layer 2 is about 1 μm to about 20 μm. The thickness of the intermediate layer 2 may not be too large, so as to ensure the energy density of the electrode assembly; the thickness of the intermediate layer 2 may not be too small, so as to ensure that the intermediate layer 2 has certain thickness and high mechanical strength, thereby avoiding failures caused by mutual connection of the first metal layer and the second metal layer on both sides of the intermediate layer 2.

In some embodiments, the metal material of the first metal layer 1 and the second metal layer 3 may be the same metal and a combination thereof (alloy), or may be two different metals and a combination (alloy) thereof. In some embodiments, the material of the first metal layer 1 and the second metal layer 3 may be at least one independently selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and a combination (alloy) thereof.

In some embodiments, the porosity of the first metal layer 1 and the second metal layer 3 ranges from about 0% to about 60%. The first metal layer and the second metal layer have certain porosity, which facilitates weight reduction and increases the effective material loading thereof. However, when the porosity is too large, pores in a metal layer are excessive, so that a transmission path of internal electrons along the metal layer is lengthened, and the electron conductivity is decreased, thereby affecting the electrical performance of the electrode assembly.

In some embodiments, the thickness of the first metal layer 1 and the second metal layer 3 is about 0.1 μm to about 10 μm. The thickness of the metal layer may not be too large, thereby ensuring that the thickness is smaller than or equal to that of the existing current collector, which is beneficial for ensuring the energy density of the electrode assembly. In addition, when the metal layer is too thick, the production efficiency of a plating layer preparation process is affected, and the preparation speed of the entire electrode assembly is reduced. Meanwhile, the thickness of the metal layer should not be too small, so that the metal layer has a high electron conductivity and ensures the electrical performance of the electrode assembly.

In some embodiments, a preparation method of the composite current collector of the present application includes the following steps: forming the first metal layer 1 and the second metal layer 3 on the first surface and the second surface of the intermediate layer 2 respectively by, for example, but not limited to, sputtering, vacuum deposition, ion plating and laser pulse deposition; forming the through hole 31 penetrating through the intermediate layer 2, the first metal layer 1 and the second metal layer 3 by, for example, not limited to, high energy laser drilling; and then, putting one side of the composite current collector 10 on a substrate, evenly coating the other side of the composite current collector 10 with slurry containing the ionic conductor by a blade coating method, filling the slurry into the through hole 31, performing the drying and cleaning processes, and taking down the composite current collector from the substrate to complete the preparation of the composite current collector 10. It will be appreciated that a person skilled in the art can select a conventional preparation method in the art to replace any specific preparation method in the above process according to actual operation requirements without being limited thereto.

2. Composite Electrode

Some embodiments of the present application provide a composite electrode including the composite current collector of the present application. The composite electrode of the present application is beneficial to the infiltration of an electrolytic solution, and can not only improve the speed of a liquid injection process during the processing of a battery, but also accelerate the ion passing rate in the subsequent use of the battery, thereby further improving the battery rate performance.

Figure 2:
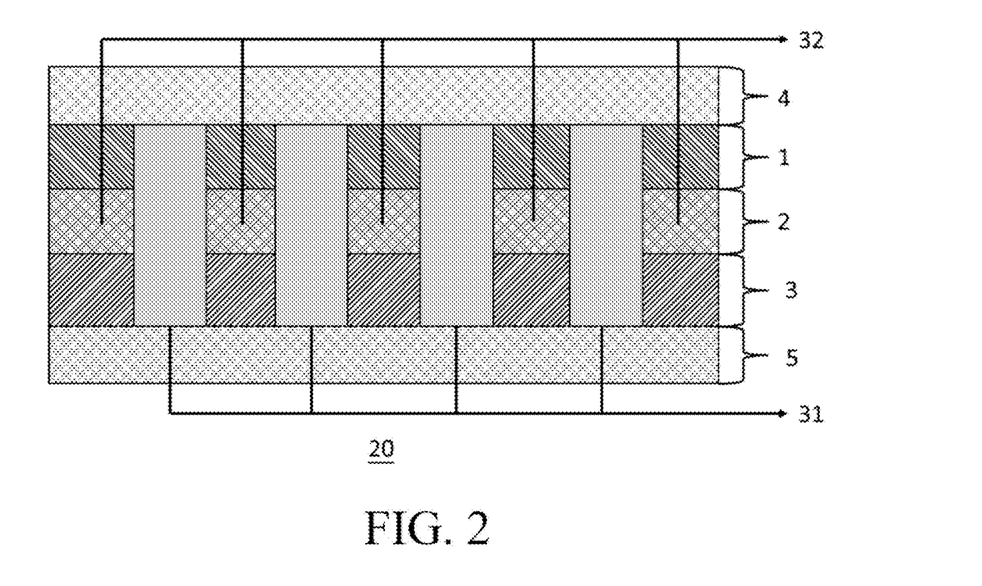
FIG. 2 is a cross-sectional view of a composite electrode in some embodiments of the present application.

FIG. 2 is a structure diagram of a composite electrode 20 according to some embodiments of the present application.

As shown in FIG. 2, the composite electrode 20 includes: the composite current collector 10 in the above embodiments, a cathode active material layer 4 and an anode active material layer 5. The cathode active material layer 4 covers the first metal layer 1, and the anode active material layer 5 covers the second metal layer 3. The through hole 31 constitutes an ion path connecting the cathode active material layer 4 and the anode active material layer 5 on both sides of the composite current collector, and the electrical performance of the composite electrode 20 is effectively improved.

The cathode active material layer 4 and the anode active material layer 5 may be prepared by using materials, structures and manufacturing methods well known in the art.

In some embodiments, the cathode active material layer includes at least one lithiated intercalation compound which reversibly intercalates and deintercalates lithium ions, including but not limited to one or more of lithium cobalt oxide, lithium nickel cobalt manganese oxide, lithium nickel cobalt aluminate, lithium manganate, lithium manganese iron phosphate, lithium vanadium phosphate, lithium vanadium oxide phosphate, lithium iron phosphate, lithium titanate, and lithium-rich manganese-based materials.

In some embodiments, the anode active material layer includes any material capable of electrochemically occluding and releasing metal ions such as lithium ions. In some embodiments, the anode active material layer includes a carbonaceous material, a silicon carbon material, an alloy material, or a lithium-containing metal composite oxide material. In some embodiments, the anode active material layer includes one or more of those as described above.

In some embodiments, when the anode active material layer includes an alloy material, the anode active material layer may be formed by using methods such as evaporation, sputtering, or plating.

In some embodiments, when the anode active material layer includes lithium metal, for example, the anode active material layer is formed by a conductive framework having a spherical hinge shape and metal particles dispersed in the conductive framework, the spherical hinge conductive framework may have the porosity of about 5% to about 85%, and a protective layer may be provided on the lithium metal anode active material layer.

In some embodiments, the above composite electrode 20 may be prepared by respectively coating both sides of the composite current collector 10 with cathode and anode active materials, wherein the presence of the plurality of through holes 31 helps to ensure the capacity performance of the cathode and anode active materials under high electrode compacted density and high coating weights of the cathode and anode active materials, thereby further improving the energy density of the composite electrode.

In some embodiments, the coating weight of the cathode active material layer 4 on the composite current collector is about 100 $g/m^2$ to about 500 $g/m^2$, or about 180 $g/m^2$ to about 200 $g/m^2$. The coating weight of the anode active material layer 5 on the composite current collector is about 50 $g/m^2$ to about 300 $g/m^2$, or about 95 $g/m^2$ to about 105 $g/m^2$.

In some embodiments, the compacted density of the cathode active material layer 4 is about 2.0 $g/cm^3$ to about 5 $g/cm^3$, or about 4.0 $g/cm^3$ to about 4.2 $g/cm^3$. The compacted density of the anode active material layer 5 is about 1.0 $g/cm^3$ to about 2.5 $g/cm^3$, or about 1.7 $g/cm^3$ to about 1.85 $g/cm^3$.

It will be appreciated that although the plurality of through holes 31 penetrates through only the composite current collector in the embodiments shown in FIG. 2, and there is no through hole in the cathode active material layer 4 and the anode active material layer 5, this is only an exemplary embodiment for describing one of the structures of the composite electrode of the present application. According to some other embodiments of the present application, the plurality of through holes 31 in the composite electrode can further penetrate through the cathode active material layer 4 and the anode active material layer 5.

Figure 3:
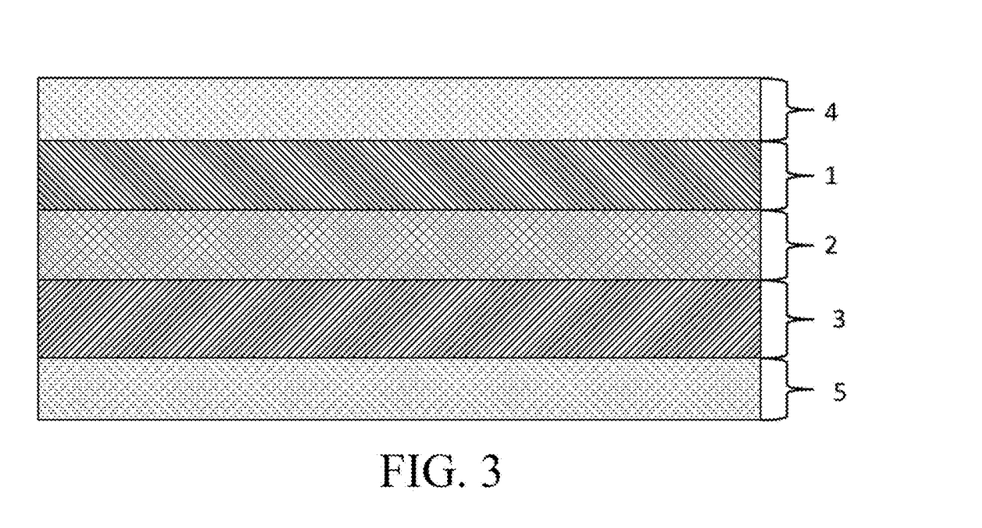
FIG. 3 is a cross-sectional view of a composite electrode before a through hole is formed in some embodiments of the present application.
Figure 4:
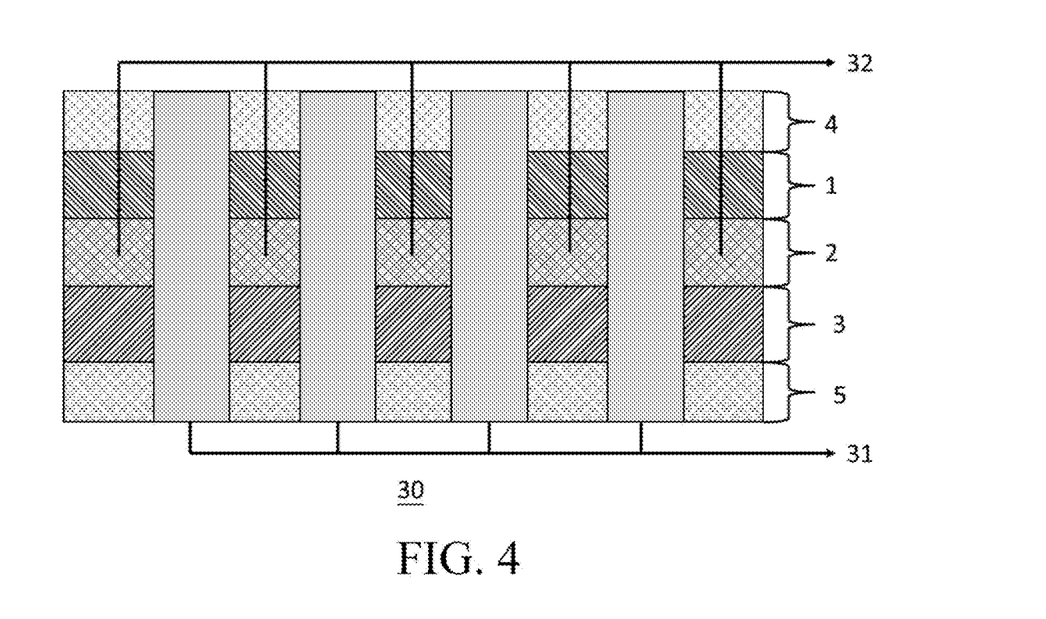
FIG. 4 is a cross-sectional view of a composite electrode having a through hole in some embodiments of the present application.

As shown in FIG. 3 and FIG. 4, in some embodiments, the composite electrode where the through hole has not been formed may be obtained by first coating the cathode active material layer and the anode active material layer on the surface of the composite current collector where the through hole is not formed, and then performing drying and cold pressing processes. Subsequently, the composite electrode is directly drilled by means of, for example, but not limited to, a high energy laser, and is filled with an electrically insulated ionic conductor, so as to obtain a composite electrode 30 including a through hole which penetrates through the composite current collector, the cathode active material layer 4 and the anode active material layer 5.

In some embodiments, the composite electrode may further include a conductive coating, wherein the conductive coating is arranged in at least one of the following two situations: between the cathode active material layer 4 and the first metal layer 1, or between the anode active material layer 5 and the second metal layer 2.

In some embodiments, the conductive coating includes a conductive agent and a polymer, wherein the conductive agent is at least one selected from the group consisting of carbon nanotubes, conductive carbon black, acetylene black, artificial graphite, graphene, and metal nanowires; and the polymer is at least one selected from the group consisting of polyethylene terephthalate, polybutylene terephthalate, polyethylene naphthalate, polyetheretherketone, polyimide, polyamide, polyethylene glycol, polyamideimide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, polyethylene, polyvinyl chloride, polystyrene, polyether nitrile, polyurethane, polyphenylene oxide, polyester, polysulfone, and derivatives thereof. The presence of the conductive coating may further increase the electron conduction passage and improve the electrical performance; and meanwhile, the adhesion between the cathode and anode active material layers and the composite current collector is improved.

3. Electrochemical Device

Some embodiments of the present application also provide an electrochemical device including the composite current collector of the present application. In some embodiments, the electrochemical device is a lithium-ion battery. The lithium-ion battery includes an electrode assembly composed of a composite electrode of the present application, a tab and a separator, and an electrolytic solution.

In some embodiments, a preparation method of the lithium-ion battery includes: laminating and winding the composite electrode of the present application and the separator together to form an electrode assembly. The electrode assembly is then charged into, for example, an aluminum plastic film, and the electrolytic solution is injected. Then, vacuum encapsulation, standing, formation, shaping and other processes are performed to obtain a lithium-ion battery.

The electrolytic solution and the separator used in the present application are not particularly limited, and may be prepared by using materials, structures and manufacturing methods well known in the art.

For example, the separator may include a substrate layer and a surface treatment layer. The substrate layer is a nonwoven fabric, a film or a composite film having a porous structure, and the material of the substrate layer is at least one selected from the group consisting of polyethylene, polypropylene, polyethylene terephthalate and polyimide. Specifically, a polypropylene porous film, a polyethylene porous film, polypropylene nonwoven fabric, polyethylene nonwoven fabric or a polypropylene-polyethylene-polypropylene porous composite film can be adopted.

At least one surface of the substrate layer is provided with the surface treatment layer, and the surface treatment layer may be a polymer layer or an inorganic material layer, or may be a layer formed by mixing a polymer and an inorganic material.

The inorganic material layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene. The polymer layer includes a polymer, and the material of the polymer is at least one selected from the group consisting of polyamide, polyacrylonitrile, acrylate polymer, polyacrylic acid, polyacrylate, polyvinylpyrrolidone, polyvinyl ether, polyvinylidene fluoride and poly(vinylidene fluoride-hexafluoropropylene).

The separator needs to have mechanically robustness to withstand the stretching and piercing of the electrode material, and a pore size of the separator is typically less than 1 micron. Various separators including microporous polymer membranes, non-woven mats and inorganic membranes have been used in the lithium-ion batteries, wherein the polymer membranes based on microporous polyolefin materials are the most commonly used separators in combination with the electrolytic solution. The microporous polymer membranes can be made very thin (typically about 5 µm-25 µm) and highly porous (typically about 20%-50%) to reduce electrical resistance and improve ion conductivity. Meanwhile, the polymer membrane still has mechanical robustness. A person skilled in the art will appreciate that various separators widely used in the lithium-ion batteries are suitable for use in the present application.

In some embodiments, the electrolytic solution includes a lithium salt and a non-aqueous solvent. The lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, $LiPF_6$ is selected as the lithium salt because $LiPF_6$ can give high ionic conductivity and improve cycle characteristics. The non-aqueous solvent can be a carbonate compound, a carboxylate compound, an ether compound, other organic solvent or a combination thereof.

The carbonate compound may be a chain carbonate compound, a cyclic carbonate compound, a fluorocarbonate compound, or a combination thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate and a combination thereof.

A person skilled in the art will appreciate that although the lithium-ion battery is used as an example for description above, the person skilled in the art, after reading this application, can think of that the composite current collector of this application can be used in other suitable electrochemical devices. Such electrochemical devices include any device for electrochemical reaction, and specific examples thereof include all kinds of primary batteries, secondary batteries, fuel cells, solar cells or capacitors. In particular, the electrochemical device is a lithium secondary battery, including a lithium metal secondary battery, a lithium-ion secondary battery, a lithium polymer secondary battery or a lithium ion polymer secondary battery.

The composite current collector of the present application and the electrochemical device including the same have the following beneficial effects: (1) first, a through hole is provided in the composite current collector, and the through hole is filled with an electrically insulated ionic conductive material, so that ion path connecting cathode and anode materials on both sides of the composite current collector is increased; (2) the composite current collector containing the through hole helps to improve the compacted density of the electrode and the thickness of a coating film, thereby improving the energy density of the electrode assembly; and (3) the composite current collector structure containing the through hole is beneficial to the sufficient infiltration of the electrolytic solution as, on the one hand, the speed of the liquid injection process can be increased, and on the other hand, the ion passing rate can be accelerated, and the rate performance of the electrochemical device can be further improved.

4. Electronic Device

Some embodiments of the present application further provide an electronic device, including the electrochemical device in the embodiments of the present application.

The electronic device of the present application is not particularly limited and can be any electronic device known in the prior art. In some embodiments, the electronic device can include, but not limited to, notebook computers, pen input computers, mobile computers, e-book players, portable telephones, portable fax machines, portable copy machines, portable printers, headset stereo headphones, VCRs, LCD TVs, portable cleaners, portable CD players, mini disc players, transceivers, electronic notebooks, calculators, memory cards, portable recorders, radios, backup powers, motors, cars, motorcycles, power bicycles, bicycles, lighting fixtures, toys, game consoles, clocks, power tools, flashlights, cameras, large household batteries and lithium ion capacitors.

Hereinafter, the lithium-ion battery is taken as an example and the preparation of the lithium-ion battery is described in conjunction with a specific embodiment. A person skilled in the art would understand that the preparation method described in the present application is merely an example, and any other suitable preparation methods fall within the scope of the present application.

5. Specific Embodiment

After the lithium-ion battery of the following specific embodiments and comparative examples is completed, the weight and volume size of the lithium-ion battery are recorded. The lithium-ion battery is then subjected to discharge energy density detection at different discharge rates of 0.1 C and 2 C. A specific embodiment of the discharge energy density detection will be described below.

Discharge Energy Density Detection (1) Energy Density (Wh/L) During Discharging at 0.1 C A lithium-ion battery was allowed to stand at a normal temperature for 30 minutes, and was charged at a constant current of 0.05 C to a voltage of 4.4 V (nominal voltage), and then an electrochemical device was discharged to 3.0 V at a rate of 0.05 C. The above charge/discharge steps were repeated for 3 cycles to complete the formation of the electrochemical device to be tested. After completing the formation of the electrochemical device, the device was charged at a constant current of 0.1 C to a voltage of 4.4 V, then the electrochemical device was discharged to 3.0 V at a discharge rate of 0.1 C, the discharge capacity was recorded, and then the energy density thereof during discharging at 0.1 C was calculated:

Energy density(Wh/L)=discharge capacity(Wh)/ lithium-ion battery volume size(L)

(2) Energy Density (Wh/L) During Discharging at 2 C

A lithium-ion battery was allowed to stand at a normal temperature for 30 minutes, and was charged at a constant current of 0.05 C to a voltage of 4.4 V (nominal voltage), and then an electrochemical device was discharged to 3.0 V at a rate of 0.05 C. The above charge/discharge steps were repeated for 3 cycles to complete the formation of the electrochemical device to be tested. After completing the formation of the electrochemical device, the device was charged at a constant current of 2 C to a voltage of 4.4 V, then the electrochemical device was discharged to 3.0 V at a discharge rate of 2 C, the discharge capacity was recorded, and then the energy density thereof during discharging at 0.1 C was calculated:

Energy density(Wh/L)=discharge capacity(Wh)/ lithium-ion battery volume size(L)

Embodiment 1

(1) Preparation of Double-Sided Heterogeneous Composite Current Collector

On the surface of a polyethylene terephthalate (PET) film having the thickness of 12 μm, a plating layer of metal Cu and a plating layer of metal Al having the thickness of 0.5 μm were separately prepared on both sides of the polyethylene terephthalate (PET) film by vacuum deposition as current collectors for anode and cathode active materials. Subsequently, the surface of a composite current collector was drilled by a high energy laser, with a pore size of 20 μm and a pore density of 4 pores/cm$^2$, the holes were evenly distributed over the entire surface of the composite current collector, and the total area ratio of all the holes on the entire surface of the composite current collector was about 0.001% in this case. One side of the composite current collector was placed on a polytetrafluoroethylene plate and the two were sufficiently bonded at an interface. Polyvinylidene fluoride (PVDF) was added to N-methylpyrrolidone (NMP) as a suspension, and slurry having a solid content of 0.5 was prepared and stirred evenly. The slurry was evenly coated on a metal layer on the other side of the composite current collector by a blade coating method, and the slurry was filled into the holes and then dried at 90° C. The residual PVDF on the surface of the composite current collector was then washed with ethyl acetate, and the composite current collector layer was removed from the polytetrafluoroethylene plate to complete the preparation of a double-sided heterogeneous composite current collector.

(2) Preparation of Electrode

Cathode active materials, lithium cobalt oxide (LiCoO$_2$), conductive carbon black (Super P) and polyvinylidene fluoride (PVDF) were mixed at a weight ratio of 97.5:1.0:1.5, N-methylpyrrolidone (NMP) was added as a solvent, and slurry having a solid content of 0.75 was prepared and stirred evenly. The slurry was evenly coated on a metal Al plating layer of the composite current collector, and the weight of the cathode active materials on an electrode was 180 g/m$^2$. Drying was performed at 90° C. to complete single-sided coating on a cathode side of the electrode. After the coating was completed, the cathode active material layer of the electrode was cold-pressed to a compacted density of 4.0 g/cm$^3$ to complete the entire preparation process of the cathode side of the electrode.

Subsequently, anode active materials, graphite, conductive carbon black (Super P) and styrene butadiene rubber (SBR) were mixed at a weight ratio of 96:1.5:2.5, deionized water (H$_2$O) was added as a solvent, and slurry having a solid content of 0.7 was prepared and stirred evenly. The slurry was evenly coated on a metal Cu plating layer of the composite current collector, and the weight of the anode active materials on an electrode was 95 g/m$^2$. Drying was performed at 110° C. to complete single-sided coating on an anode side of the electrode. After the coating was completed, the anode active material layer of the electrode was cold-pressed to a compacted density of 1.7 g/cm$^3$. Subsequently, auxiliary processes such as tab welding and gummed paper pasting were used to complete the entire preparation process of all electrodes based on the double-sided heterogeneous composite current collector.

(3) Preparation of Electrolytic Solution

In a dry argon atmosphere, organic solvents ethylene carbonate (EC), ethyl methyl carbonate (EMC) and diethyl carbonate (DEC) were first mixed in a mass ratio of EC:EMC:DEC=30:50:20, and then a lithium salt lithium hexafluorophosphate (LiPF$_6$) was added to the organic solvents to be dissolved and evenly mixed to obtain an electrolytic solution having a lithium salt concentration of 1.15 M.

(4) Preparation of Lithium-Ion Battery

Polyethylene (PE) with the thickness of 15 μm was used as a separator, the separator and the electrode based on the double-sided heterogeneous composite current collector were stacked in order, then the stacked electrode and separator were rolled into an electrode assembly. The electrode assembly was injected with liquid after top side sealing, the liquid-injected electrode assembly was formed (charged to 3.3 V at a constant current of 0.02 C and then charged to 3.6 V at a constant current of 0.1 C), and then the performance of the electrode assembly was preliminarily detected. A soft-packed lithium-ion battery was finally obtained.

Embodiment 2

The preparation manner of the present embodiment was the same as that of Embodiment 1, except that in (1) of Embodiment 2, the pore size was 100 μm, and the pore area ratio was about 0.03%.

Embodiment 3

The preparation manner of the present embodiment was the same as that of Embodiment 1, except that in (1) of Embodiment 3, the pore size was 500 μm, and the pore area ratio was about 0.80%.

Embodiment 4

The preparation manner of the present embodiment was the same as that of Embodiment 1, except that in (1) of Embodiment 4, the pore size was 3000 μm, and the pore area ratio was about 28%.

Embodiment 5

The preparation manner of the present embodiment was the same as that of Embodiment 3, except that in (1) of Embodiment 5, the pore density was 1 pore/cm$^2$, and the pore area ratio was about 0.20%.

Embodiment 6

The preparation manner of the present embodiment was the same as that of Embodiment 3, except that in (1) of Embodiment 6, the pore density was 10 pores/cm$^2$, and the pore area ratio was about 2.0%.

Embodiment 7

The preparation manner of the present embodiment was the same as that of Embodiment 3, except that in (1) of Embodiment 7, the pore density was 25 pores/cm$^2$, and the pore area ratio was about 5%.

Embodiment 8

The preparation manner of the present embodiment was the same as that of Embodiment 3, except that in (1) of Embodiment 8, the pore density was 100 pores/cm$^2$, and the pore area ratio was about 20%.

Embodiment 9

The preparation manner of the present embodiment was the same as that of Embodiment 1, except that in (1) of Embodiment 9, the pore size was 1100 μm, the pore density is 1 pore/cm$^2$, and the pore area ratio was about 1.0%.

Embodiment 10

The preparation manner of the present embodiment was the same as that of Embodiment 9, except that in (1) of Embodiment 10, the pore density was 10 pores/cm$^2$, and the pore area ratio was about 10%.

Embodiment 11

The preparation manner of the present embodiment was the same as that of Embodiment 9, except that in (1) of Embodiment 11, the pore density was 32 pores/cm$^2$, and the pore area ratio was about 30%.

Embodiment 12

The preparation manner of the present embodiment was the same as that of Embodiment 7, except that in (1) of Embodiment 12, polyacrylonitrile (PAN) was added to N-methylpyrrolidone (NMP) as a suspension, and slurry having a solid content of 0.55 was prepared and stirred evenly. The slurry was evenly coated on a metal layer on the other side of the composite current collector by a blade coating method, and the slurry was filled into the holes and then dried at 90° C. The residual PAN on the surface of the composite current collector was then washed with ethyl acetate.

Embodiment 13

The preparation manner of the present embodiment was the same as that of Embodiment 7, except that in (1) of Embodiment 13, polyethylene oxide (PEO) was added to ethyl acetate as a suspension, and slurry having a solid content of 0.6 was prepared and stirred evenly. The slurry was evenly coated on a metal layer on the other side of the composite current collector by a blade coating method, and the slurry was filled into the holes and then dried at 90° C. The residual PEO on the surface of the composite current collector was then washed with toluene.

Embodiment 14

The preparation manner of the present embodiment was the same as that of Embodiment 7, except that in (1) of Embodiment 14, aluminum oxide particles and polyvinylidene fluoride (PVDF) were added to N-methylpyrrolidone (NMP) as a suspension, and slurry having a solid content of 0.7 was prepared and stirred evenly, wherein a mass ratio of aluminum oxide to PVDF was 95:5. The slurry was evenly coated on a metal layer on the other side of the composite current collector by a blade coating method, and the slurry was filled into the holes and then dried at 90° C. The residual aluminum oxide particles and PVDF on the surface of the composite current collector were then washed with ethyl acetate.

Embodiment 15

The preparation manner of the present embodiment was the same as that of Embodiment 7, except that in (2) of Embodiment 15, the weight of the cathode active material on the electrode was 190 g/m$^2$, and the weight of the anode active material on the electrode was 100 g/m$^2$.

Embodiment 16

The preparation manner of the present embodiment was the same as that of Embodiment 7, except that in (2) of Embodiment 16, the weight of the cathode active material on the electrode was 200 g/m$^2$, and the weight of the anode active material on the electrode was 105 g/m$^2$.

Embodiment 17

The preparation manner of the present embodiment was the same as that of Embodiment 7, except that in (2) of Embodiment 17, the cathode active material layer of the electrode was cold-pressed to a compacted density of 4.10 g/cm$^3$, and the anode active material layer was cold-pressed to a compacted density of 1.77 g/cm$^3$.

Embodiment 18

The preparation manner of the present embodiment was the same as that of Embodiment 7, except that in (2) of Embodiment 18, the cathode active material layer of the electrode was cold-pressed to a compacted density of 4.20 g/cm$^3$, and the anode active material layer was cold-pressed to a compacted density of 1.85 g/cm$^3$.

Embodiment 19

The preparation manner of the present embodiment was the same as that of Embodiment 7, except that the step of drilling in (1) of Embodiment 1 was carried out after the preparation of the electrode in (2) of Embodiment 19 was completed.

Embodiment 20

The preparation manner of the present embodiment was the same as that of Embodiment 7, except that before the preparation of the electrode in (2) of Embodiment 20, the current collector prepared in the previous step was pre-coated: conductive carbon black (Super P) and styrene butadiene rubber (SBR) were mixed at a weight ratio of 95:5, deionized water ($H_2O$) was added as a solvent, and slurry having a solid content of 0.8 was prepared and stirred evenly. The slurry was evenly coated on a metal Cu plating layer of the composite current collector and dried at 110° C. to obtain an anode pre-coating, conductive carbon black (Super P) and styrene butadiene rubber (SBR) were mixed at a weight ratio of 97:3, deionized water ($H_2O$) was added as a solvent, and slurry having a solid content of 0.85 was prepared and stirred evenly. The slurry was evenly coated on a metal Al plating layer of the composite current collector and dried at 110° C. to obtain a cathode pre-coating.

Comparative Example 1

(1) Preparation of Anode

Anode active materials graphite, conductive carbon black (Super P) and styrene butadiene rubber (SBR) were mixed at a weight ratio of 96:1.5:2.5, deionized water ($H_2O$) was added as a solvent, and slurry having a solid content of 0.7 was prepared and stirred evenly. The slurry was evenly coated on one side of an anode current collector copper foil, wherein the weight of the anode active material was 95 g/m². The slurry was dried at 110° C. to obtain an anode. Subsequently, the above steps were also carried out on the other side of the anode current collector copper foil in the same manner to obtain a double-sided coated anode. Subsequently, the anode was cold-pressed to a compacted density of 1.7 g/cm³.

(2) Preparation of Cathode

Cathode active materials lithium cobalt oxide ($LiCoO_2$), conductive carbon black (Super P) and polyvinylidene fluoride (PVDF) were mixed at a weight ratio of 97.5:1.0:1.5, N-methylpyrrolidone (NMP) was added as a solvent, and slurry having a solid content of 0.75 was prepared and stirred evenly. The slurry was evenly coated on one side of a cathode current collector aluminum foil, wherein the weight of the cathode active material was 180 g/m². The slurry was dried at 90° C. to obtain a cathode. Subsequently, the above steps were also carried out on the other side of the cathode current collector aluminum foil in the same manner to obtain a double-sided coated cathode. Subsequently, the cathode was cold-pressed to a compacted density of 4.0 g/cm³.

(3) Preparation of Electrolytic Solution

In a dry argon atmosphere, organic solvents ethylene carbonate (EC), ethyl methyl carbonate (EMC) and diethyl carbonate (DEC) were first mixed in a mass ratio of EC:EMC:DEC=30:50:20, and then a lithium salt lithium hexafluorophosphate ($LiPF_6$) was added to the organic solvents to be dissolved and evenly mixed to obtain an electrolytic solution having a lithium salt concentration of 1.15 M.

(4) Preparation of Lithium-Ion Battery

Polyethylene (PE) with the thickness of 15 μm was used as a separator, the cathode, the separator and the anode were stacked in order to make the separator in the center position, then the stacked electrode and separator were rolled into an electrode assembly, the electrode assembly was injected with liquid after top side sealing, the liquid-injected electrode assembly was formed (charged to 3.3 V at a constant current of 0.02 C and then charged to 3.6 V at a constant current of 0.1 C), and then the performance of the electrode assembly was preliminarily detected. A soft-packed lithium-ion battery was finally obtained.

Comparative Example 2

The preparation manner of the present comparative example was the same as that of Embodiment 1, except that in (1) of Comparative Example 2, the double-sided heterogeneous composite current collector was prepared on the surface of a PET film having the thickness of 12 μm, a plating layer of metal Cu and a plating layer of metal Al having the thickness of 0.5 μm were separately prepared on both sides by vacuum deposition as current collectors for anode and cathode active materials without forming a through hole.

Comparative Example 3

The preparation manner of the present comparative example was the same as that of Comparative Example 2, except that in (2) of Comparative Example 3, the weight of the cathode active material on the electrode was 200 g/m², and the weight of the anode active material on the electrode was 105 g/m².

Comparative Example 4

The preparation manner of the present comparative example was the same as that of Comparative Example 2, except that in (2) of Comparative Example 4, the cathode active material layer of the electrode was cold-pressed to a compacted density of 4.20 g/cm³, and the anode active material layer was cold-pressed to a compacted density of 1.85 g/cm³.

The specific embodiment parameters of the above Embodiments 1-20 and Comparative Examples 1-4 and the discharge energy density and discharge energy percentage results thereof are shown in Table 1 below.

TABLE 1

| | Average pore size (μm) | Pore density (pore/cm²) | Pore area ratio (%) | In-hole filling material | Cathode compacted density (g/cm³) | Anode compacted density (g/cm³) | Cathode coating weight (g/m²) | Anode coating weight (g/m²) | Energy density during discharge at 0.1 C (Wh/L) | Energy density during discharge at 2 C (Wh/L) | 2 C/0.1 C discharge energy (%) |
|---|---|---|---|---|---|---|---|---|---|---|---|
| Comparative Example 1 | — | — | — | — | 4.00 | 1.70 | 180 | 95 | 623 | 513 | 82.30% |

TABLE 1-continued

| | Average pore size (μm) | Pore density (pore/cm²) | Pore area ratio (%) | In-hole filling material | Cathode compacted density (g/cm³) | Anode compacted density (g/cm³) | Cathode coating weight (g/m²) | Anode coating weight (g/m²) | Energy density during discharge at 0.1 C (Wh/L) | Energy density during discharge at 2 C (Wh/L) | 2 C/0.1 C discharge energy (%) |
|---|---|---|---|---|---|---|---|---|---|---|---|
| Comparative Example 2 | — | — | — | — | 4.00 | 1.70 | 180 | 95 | 649 | 524 | 80.80% |
| Comparative Example 3 | — | — | — | — | 4.00 | 1.70 | 200 | 105 | 685 | 520 | 75.90% |
| Comparative Example 4 | — | — | — | — | 4.20 | 1.85 | 180 | 95 | 686 | 518 | 75.50% |
| Embodiment 1 | 20 | 4 | 0.001% | PVDF | 4.00 | 1.70 | 180 | 95 | 649 | 525 | 80.90% |
| Embodiment 2 | 100 | 4 | 0.03% | PVDF | 4.00 | 1.70 | 180 | 95 | 650 | 528 | 81.20% |
| Embodiment 3 | 500 | 4 | 0.80% | PVDF | 4.00 | 1.70 | 180 | 95 | 661 | 547 | 82.80% |
| Embodiment 4 | 3000 | 4 | 28% | PVDF | 4.00 | 1.70 | 180 | 95 | 659 | 544 | 82.60% |
| Embodiment 5 | 500 | 1 | 0.20% | PVDF | 4.00 | 1.70 | 180 | 95 | 654 | 534 | 81.70% |
| Embodiment 6 | 500 | 10 | 2.0% | PVDF | 4.00 | 1.70 | 180 | 95 | 665 | 554 | 83.30% |
| Embodiment 7 | 500 | 25 | 5.0% | PVDF | 4.00 | 1.70 | 180 | 95 | 678 | 570 | 84.00% |
| Embodiment 8 | 500 | 100 | 20% | PVDF | 4.00 | 1.70 | 180 | 95 | 672 | 561 | 83.50% |
| Embodiment 9 | 1100 | 1 | 1.0% | PVDF | 4.00 | 1.70 | 180 | 95 | 664 | 551 | 83.00% |
| Embodiment 10 | 1100 | 10 | 10% | PVDF | 4.00 | 1.70 | 180 | 95 | 675 | 566 | 83.90% |
| Embodiment 11 | 1100 | 32 | 30% | PVDF | 4.00 | 1.70 | 180 | 95 | 658 | 544 | 82.70% |
| Embodiment 12 | 500 | 25 | 5.0% | PAN | 4.00 | 1.70 | 180 | 95 | 676 | 568 | 84.10% |
| Embodiment 13 | 500 | 25 | 5.0% | PEO | 4.00 | 1.70 | 180 | 95 | 676 | 569 | 84.20% |
| Embodiment 14 | 500 | 25 | 5.0% | $Al_2O_3$ | 4.00 | 1.70 | 180 | 95 | 674 | 567 | 84.30% |
| Embodiment 15 | 500 | 25 | 5.0% | PVDF | 4.00 | 1.70 | 190 | 100 | 690 | 571 | 82.80% |
| Embodiment 16 | 500 | 25 | 5.0% | PVDF | 4.00 | 1.70 | 200 | 105 | 705 | 573 | 81.30% |
| Embodiment 17 | 500 | 25 | 5.0% | PVDF | 4.10 | 1.77 | 180 | 95 | 688 | 569 | 82.70% |
| Embodiment 18 | 500 | 25 | 5.0% | PVDF | 4.20 | 1.85 | 180 | 95 | 704 | 571 | 81.10% |
| Embodiment 19 | 500 | 25 | 5.0% | PVDF | 4.00 | 1.70 | 180 | 95 | 646 | 545 | 84.40% |
| Embodiment 20 | 500 | 25 | 5.0% | PVDF | 4.00 | 1.70 | 180 | 95 | 682 | 576 | 84.50% |

It can be seen from Table 1 that the lithium-ion battery in the embodiments of the present application has not only the inherent advantages of the double-sided heterogeneous composite current collector, but also the relative advantages, compared with Comparative Example 1, i.e., a lithium-ion battery of a conventional copper-aluminum foil current collector. That is, the electrode assembly structure can be designed by self-winding, thereby further simplifying the electrode assembly preparation process, improving production efficiency and product optimization rate, and reducing production cost. Meanwhile, by reducing the proportion of current collector and separator materials, the volume energy density and mass energy density of the lithium-ion battery can be further improved.

In addition, compared with Comparative Example 2, i.e., compared with a lithium-ion battery using a double-sided heterogeneous composite current collector, the present application effectively improves the rate performance of the lithium-ion battery by improving the ion conducting path in the composite current collector, so that the energy density of the lithium-ion battery is greatly improved during large rate discharging at 2 C.

On the other hand, by comparing Embodiment 16 with Comparative Example 3, it was found that the lithium-ion battery using the composite current collector of the present application presented superior rate performance and higher energy density at the same high coating weight, especially during large rate discharging at 2 C.

Finally, by comparing Embodiment 18 with Comparative Example 4, it was found that the lithium-ion battery using the composite current collector of the present application presented superior rate performance and higher energy density at the same compacted density, especially during large rate discharging at 2 C.

Citations of "some embodiments", "part of embodiments", "one embodiment", "another example", "example", "specific example" or "part of examples" in the whole specification mean that at least one embodiment or example in the present application includes specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by a person skilled in the art that the above embodiments cannot be interpreted as limiting the present application, and the embodiments can be changed, substituted and modified without departing from the spirit, principle and scope of the present application.

What is claimed is:

1. A composite current collector, comprising:
   an intermediate layer, having a first surface and a second surface opposite to the first surface;
   a first metal layer, disposed on the first surface;
   a second metal layer, disposed on the second surface; and
   a through hole, penetrating through the intermediate layer, the first metal layer and the second metal layer, wherein the through hole is filled with an electrically insulated ionic conductor.

2. The composite current collector according to claim 1, wherein the pore size of the through hole is 20 μm to 3000 μm, the average pore density of the through hole is 1 pore/cm² to 100 pores/cm², and the average pore area ratio of the through hole is 0.001% to 30%.

3. The composite current collector according to claim 1, wherein each of the first metal layer and the second metal layer is at least one selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and a combination thereof.

4. The composite current collector according to claim 1, wherein the ionic conductor is a solid electrolyte material or a mixture of an inorganic material and a binder.

5. The composite current collector according to claim 4, wherein the solid electrolyte material is at least one selected from the group consisting of polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

6. The composite current collector according to claim 4, wherein the inorganic material comprises an inorganic oxide, the inorganic oxide being at least one selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al,Ga)_x(Ti,Ge)_{2-x}Si_yP_{3-y}O_{12}$, wherein $0 \leq x \leq 1$ and $0 \leq y \leq 1$, lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$ and $0<y<2$), $SiS_2$ glass ($Li_xSi_yS_z$, wherein $0 \leq x<3$, $0<y<2$, and $0<z<4$), $P_2S_5$ glass ($Li_xP_yS_z$, wherein $0 \leq x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, and garnet ceramic ($Li_{3+x}La_3M_2O_{12}$, wherein $0 \leq x \leq 5$, and M is Te, Nb, or Zr); and the binder is at least one selected from the group consisting of polyamide, polyurethane, ethylene-vinyl acetate copolymer (EVA), ethylene-vinyl alcohol copolymer (EVOH), acrylate, sodium alginate (SA), polyacrylic acid (PAA), polyvinyl alcohol (PVA), carboxymethyl chitosan, gelatin, polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

7. The composite current collector according to claim 1, wherein the intermediate layer is at least one selected from the group consisting of polyethylene terephthalate, polybutylene terephthalate, polyethylene naphthalate, polyetheretherketone, polyimide, polyamide, polyethylene glycol, polyamideimide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, polyethylene, polyvinyl chloride, polystyrene, polyether nitrile, polyurethane, polyphenylene oxide, polyester, polysulfone, and derivatives thereof.

8. A composite electrode, comprising:
a composite current collector comprising:
an intermediate layer, having a first surface and a second surface opposite to the first surface;
a first metal layer, disposed on the first surface;
a second metal layer, disposed on the second surface; and
a through hole, penetrating through the intermediate layer, the first metal layer and the second metal layer, wherein the through hole is filled with an electrically insulated ionic conductor;
a cathode active material layer, disposed on the first metal layer; and
an anode active material layer, disposed on the second metal layer.

9. The composite electrode according to claim 8, wherein the pore size of the through hole is about 20 μm to about 3000 μm, the average pore density of the through hole is about 1 pore/cm² to about 100 pores/cm², and the average pore area ratio of the through hole is about 0.001% to about 30%.

10. The composite electrode according to claim 8, wherein each of the first metal layer and the second metal layer is at least one selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and a combination thereof.

11. The composite electrode according to claim 8, wherein the ionic conductor is a solid electrolyte material or a mixture of an inorganic material and a binder.

12. The composite electrode according to claim 11, wherein the solid electrolyte material is at least one selected from the group consisting of polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

13. The composite electrode according to claim 11, wherein the inorganic material comprises an inorganic oxide, the inorganic oxide being at least one selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al,Ga)_x(Ti,Ge)_{2-x}Si_yP_{3-y}O_{12}$, wherein $0 \leq x \leq 1$ and $0 \leq y \leq 1$, lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$ and $0<y<2$), $SiS_2$ glass ($Li_xSi_yS_z$, wherein $0 \leq x<3$, $0<y<2$, and $0<z<4$), $P_2S_5$ glass ($Li_xP_yS_z$, wherein $0 \leq x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, and garnet ceramic ($Li_{3+x}La_3M_2O_{12}$, wherein $0 \leq x \leq 5$, and M is Te, Nb, or Zr); and the binder is at least one selected from the group consisting of polyamide, polyurethane, ethylene-vinyl acetate copolymer (EVA), ethylene-vinyl alcohol copolymer (EVOH), acrylate, sodium alginate (SA), polyacrylic acid (PAA), polyvinyl alcohol (PVA), carboxymethyl chitosan, gelatin, polyvinylidene fluoride-hexafluoropropylene (PVDF-HFP), polyvinylidene fluoride (PVDF), polyacrylonitrile (PAN), polymethyl methacrylate (PMMA), polyphenylene oxide (PPO), polypropylene carbonate (PPC), polyethylene oxide (PEO), and derivatives thereof.

14. The composite electrode according to claim 8, wherein the intermediate layer is at least one selected from the group consisting of polyethylene terephthalate, polybutylene terephthalate, polyethylene naphthalate, polyetheretherketone, polyimide, polyamide, polyethylene glycol, polyamideimide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, polyethylene, polyvinyl chloride, polystyrene, polyether nitrile, polyurethane, polyphenylene oxide, polyester, polysulfone, and derivatives thereof.

15. The composite electrode according to claim 8, wherein the through hole further penetrates through the cathode active material layer and the anode active material layer.

16. The composite electrode according to claim 8, further comprising a conductive coating, arranged in at least one of the following two situations: between the cathode active material layer and the first metal layer, and between the anode active material layer and the second metal layer.

17. The composite electrode according to claim 16, wherein the conductive coating comprises a conductive agent and a polymer, the conductive agent being at least one selected from the group consisting of carbon nanotubes, conductive carbon black, acetylene black, artificial graphite, graphene, and metal nanowires; and the polymer is at least one selected from the group consisting of polyethylene terephthalate, polybutylene terephthalate, polyethylene naphthalate, polyetheretherketone, polyimide, polyamide, polyethylene glycol, polyamideimide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, polyethylene, polyvinyl chloride, polystyrene, polyether nitrile, polyurethane, polyphenylene oxide, polyester, polysulfone, and derivatives thereof.

18. An electrochemical device, comprising a composite electrode comprising:
  a composite current collector comprising:
    an intermediate layer, having a first surface and a second surface opposite to the first surface;
    a first metal layer, disposed on the first surface;
    a second metal layer, disposed on the second surface; and
    a through hole, penetrating through the intermediate layer, the first metal layer and the second metal layer, wherein the through hole is filled with an electrically insulated ionic conductor;
  a cathode active material layer, covering the first metal layer; and
  an anode active material layer, covering the second metal layer.

19. The electrochemical device according to claim 18, wherein the pore size of the through hole is about 20 µm to about 3000 µm, the average pore density of the through hole is about 1 pore/cm$^2$ to about 100 pores/cm$^2$, and the average pore area ratio of the through hole is about 0.001% to about 30%.

20. The electrochemical device according to claim 18, wherein the ionic conductor is a solid electrolyte material or a mixture of an inorganic material and a binder.

* * * * *